C. B. BLESSING.
FRUIT JUICE EXTRACTOR.
APPLICATION FILED APR. 7, 1921.

1,412,996.

Patented Apr. 18, 1922.
2 SHEETS—SHEET 1.

INVENTOR:
Charles B. Blessing
BY Allen & Allen
ATTORNEYS.

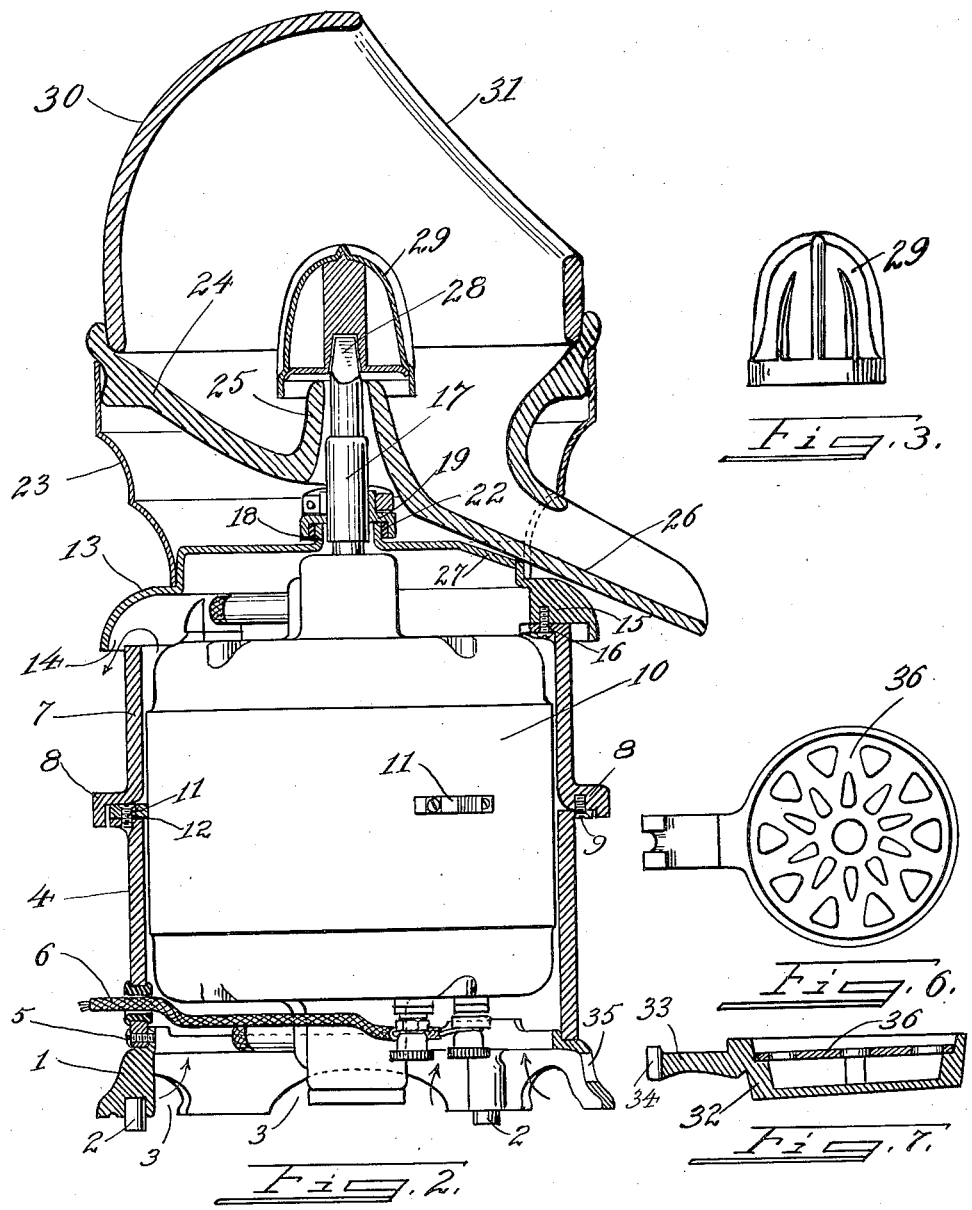

UNITED STATES PATENT OFFICE.

CHARLES B. BLESSING, OF CINCINNATI, OHIO, ASSIGNOR TO BLESSING ELECTRIC AND MANUFACTURING COMPANY, OF CHICAGO, ILLINOIS, A CORPORATION OF ILLINOIS.

FRUIT-JUICE EXTRACTOR.

1,412,996.  Specification of Letters Patent.  Patented Apr. 18, 1922.

Application filed April 7, 1921. Serial No. 459,221.

*To all whom it may concern:*

Be it known that I, CHARLES B. BLESSING, a citizen of the United States, and a resident of Cincinnati, in the county of Hamilton and State of Ohio, have invented certain new and useful Improvements in Fruit-Juice Extractors, of which the following is a full, clear, and exact description, reference being had to the accompanying drawings, forming part of this specification.

My invention relates to fruit juice extractors in which the juice is extracted by pressing the cut fruits over a motor-driven upright extracting bulb, with provision for collecting the juice in a bowl surrounding the extractor from which it is discharged through a downspout into a cup, glass or other receptacle for use, a type of machine shown in its earlier development in my Patent No. 1,258,981, of March 12, 1918.

The object of my present invention has been to simplify and improve the earlier construction in many ways, which will be hereinafter more particularly pointed out and claimed.

One of the special features of the invention consists in the construction of a casing and housing for the motor, so that it may be mounted and secured directly in the casing without the necessity of any separate frame for carrying the motor and in which the housing can be readily and easily ventilated by provision for the currents of air to enter at the base of the housing and pass around the motor and out through the top of the housing, thus keeping the motor at all times cool and dry.

Ample provision is also made to prevent any of the acid juices from the extracted fruit from by any possibility running down the motor shaft into the motor windings.

A new and improved construction of bowl, readily and easily detachable for cleaning and containing no angular portions likely to accumulate dirt is provided, and the bowl while readily detachable is arranged to be supported so that an exact fit for the removable bowl over the housing is not required, which enables me to provide as a preferable construction a bowl of china or porcelain, which otherwise would not be practicable if a close fit was necessary, as china bowls do not run uniform in size. Also as an exact fit is not necessary, the various bowls that may be used are interchangeable.

Another object is to provide a construction in which the dripping from the bowl when the glass or other container is temporarily removed may be caught and prevented from falling on the counter.

The invention consists, therefore, in the construction and combination of parts whereby the above and other advantages are attained, all of which will be pointed out in the following description and claims.

In the drawings,

Figure 2 is a central vertical section of same.

Figure 3 is a side elevation of the extracting bulb.

Figure 4 is a perspective view of the cap for the shaft to prevent leakage.

Figure 5 is a perspective view of the clamping ring for the same.

Figures 6 and 7 are plan and sections of the drip cup.

Figure 1:
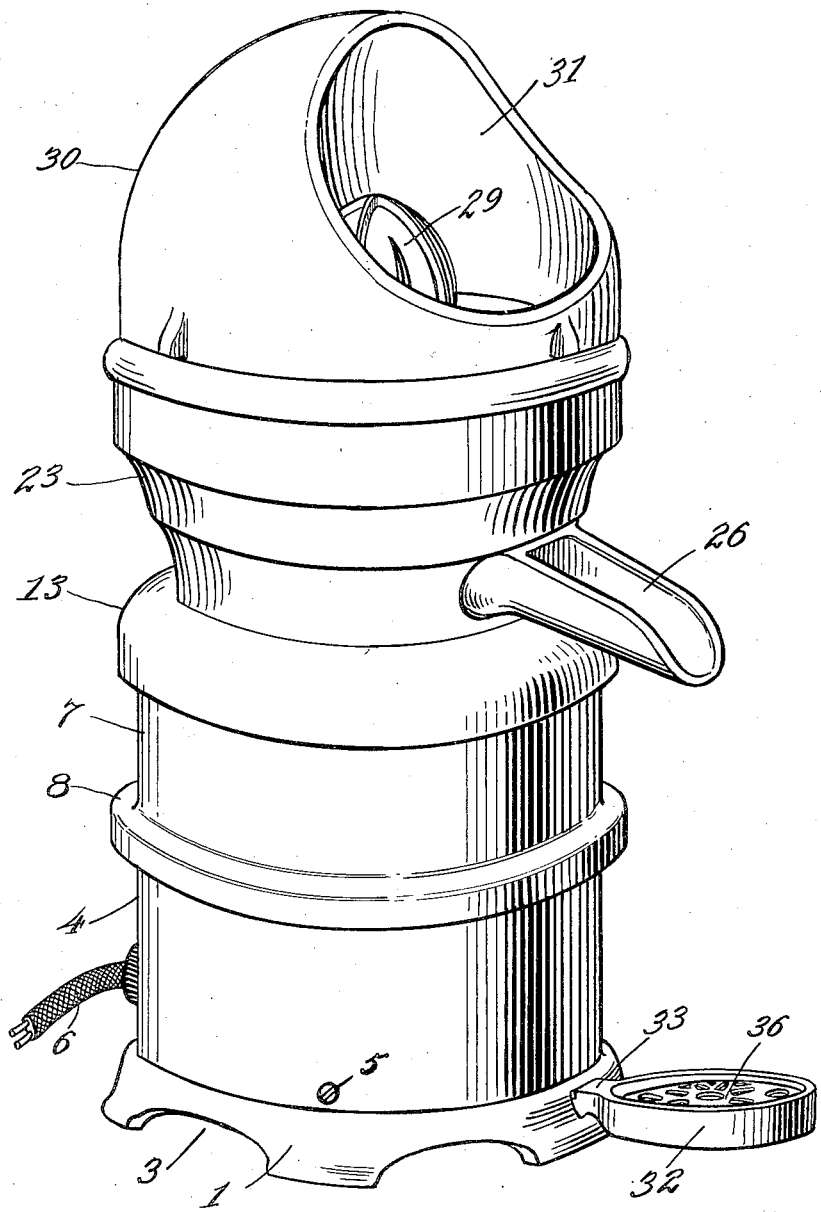
Figure 1 is a perspective view of my improved extractor.

As a housing for the driving motor and a casing for the extractor, I provide a base piece 1, with inserts of rubber or felt material 2, 2, where it is desired to stand the apparatus upon a polished counter. This base piece is provided with openings 3, 3. Mounted on the base piece is the lower portion of the casing 4, in the type shown cylindrical in shape, this casing being secured to the base piece by screws 5. Near the bottom of the lower cylindrical portion an opening is provided for the passage of the motor wires 6.

Mounted on the lower portion 4 of the casing is the upper portion 7, provided with a flange 8 to fit over the lower portion and to which it is secured by screws 9. The motor 10 is provided with lugs 11, and at the proper points the flange 8 is recessed to receive the lugs 11, which are fastened by screws 12 to the top of the lower half of the casing and clamped between the two parts of the casing, as shown.

The cover or top 13 of the housing is of a size to overhang the upper edge of the casing, leaving spaces 14 except at the points 15 where the top is secured by the screws 16 on the upper end of the casing.

The top or cover portion of the housing is provided with a central opening to allow for the passage of the vertically extending shaft 17 of the motor, and this portion has an upturned flange 18 to receive the umbrella cap 19 which is slipped on over the shaft and can be brought into tight engagement with the shaft by the clamp ring 20. The upstanding sleeve 21 of the umbrella cap is split for this purpose, so that any leakage down the shaft may be prevented, and for a further guard the umbrella cap is provided with a packing 22 between it and the flange 18 upon which the cap rotates.

Mounted on the cover is a cylindrical support 23 which is designed to support the bowl 24. This bowl is preferably made of porcelain and is provided with a central opening and upstanding boss 25 to fit around the motor shaft. The bowl has an inclined bottom with a depending spout portion 26, and the metallic support 23 is cut away to allow for the passage of this spout.

In order to ensure that the cylindrical support and the bowl shall always be mounted in correct position, the cover of the housing, which for its major portion is flat, is depressed at 27, so as to receive the spout. As the cover is permanently secured on the housing the removable bowl and its supporting portion 23 will necessarily be replaced in the correct position.

The upper end of the motor shaft 17 is formed with a squared portion 28, and over this squared portion is fitted the extracting bulb 29. This bulb has a squared central recess to readily fit on the squared recess of the shaft, and various sizes of extractors for various sorts of fruit may be readily supplied.

To prevent scattering of the juices, a hood 30 is provided, separable from but adapted to be seated within the upper edge of the bowl. This hood is also preferably of porcelain and is provided with an opening 31 for the insertion of the cut fruit from which the juice is to be extracted.

In order that when the receptacle into which the downspout discharges the juice is temporarily removed, there shall be no dripping upon the counter or other surface upon which the extractor is placed, I provide a drip cup 32 which is formed with an arm 33 and provided with a hook 34 which is passed through the slot 35 in the base. This slot is in proper line with the depression 27 in the top of the housing so that the drip cup will come directly under the discharge of the spout 26. A removable grid plate 36 is provided for the cup, to support the glass or other container for the juice. It will be obvious that the drip cup can be readily removed for cleaning.

One of the most important features of the invention as above described, is the umbrella cap device for preventing any possible leakage of juice or water down inside of the motor casing. An ordinary type of packing gland with threads or exposed parts would soon corrode under the acid juices and become a source of annoyance and leakage, and I have found that the umbrella cap 19, with the split sleeve 21 and the clamping ring 20 forms a very effective construction. It can be tightened so as to be watertight, and will rotate on the housing flange with very little friction.

All troubles incident to condensation of moisture caused by the motor being warm while in use and then cooling off, are fully taken care of by the construction of the casing with openings below and above.

Another point of advantage is that with the supplemental housing, the bowl and the hood are all removable so that these parts may be kept thoroughly clean without any danger to the motor, and inasmuch as the parts are all separable, the motor itself and the casing are readily available for other attachments, which can be furnished to fit over the squared end of the motor shaft, such as egg beaters, cream whippers, disk graters and the like.

It will also be noted that the extracting bulbs 29 are closed at the bottom inside the umbrella flange, which is provided around the lower end of the bulb, so that no dirt can accumulate within the bulbs. The hood also fits loosely within the top of the bowl, so that it can be readily turned around for any position of the user without otherwise moving the machine.

Having thus described my invention, what I claim as new and desire to secure by Letters Patent, is:—

1. In a fruit juice extractor, a casing formed in two parts with interlocking flanges to fit together, and an electric motor with lugs thereon mounted in the casing, with the lugs secured between the interlocking flanges, whereby the motor may be supported by the casing, a top for the casing with the motor shaft extending vertically through the top and a juice extracting device on said shaft.

2. In a fruit juice extractor, a casing formed in two parts with interlocking flanges to fit together, and an electric motor with lugs thereon mounted in the casing, with the lugs secured between the interlocking flanges, whereby the motor may be supported by the casing, with openings at the bottom and top of the casing for a circulation of air to prevent condensation of moisture within the casing, a top for the casing with the motor shaft extending vertically through the top and a juice extracting device on said shaft.

3. In a fruit juice extractor, the combination with a casing and an electric motor mounted in the casing, a top for the casing and a motor shaft extending vertically upward therethrough, means for securing a juice extracting device on said shaft, and means to prevent leakage down the shaft comprising an umbrella cap secured to the shaft around the shaft opening in the casing top.

4. In a fruit juice extractor, the combination with a casing and an electric motor mounted in the casing, a top for the casing and a motor shaft extending vertically upward therethrough, means for securing a juice extracting device on said shaft, and means to prevent leakage down the shaft comprising an upturned flange on the casing top and an umbrella cap to engage over said flange, with means for locking the cap tight to the shaft.

5. In a fruit juice extractor, the combination with a casing and an electric motor mounted in the casing, a top for the casing and a motor shaft extending vertically upward therethrough, means for securing a juice extracting device on said shaft, and means to prevent leakage down the shaft comprising an upturned flange on the casing top and an umbrella cap to engage over said flange, said cap having a split sleeve to engage over the shaft and a clamping ring to clamp the sleeve thereto.

6. In a fruit juice extractor, the combination with a casing and an electric motor mounted in the casing with the motor shaft extending vertically upward and a juice extracting device on said shaft, of a supplemental casing mounted on the main casing, a bowl of china or like material loosely mounted on the supplemental casing having an upstanding boss provided with a central opening to fit over the motor shaft, whereby the bowl can be readily and easily removed for cleaning and similar bowls exchanged therewith.

7. In a fruit juice extractor, the combination with a casing and an electric motor mounted in the casing with the motor shaft extending vertically upward and a juice extracting device on said shaft, of a supplemental casing mounted on the main casing, a bowl of china or like material loosely mounted on the supplemental casing having an upstanding boss provided with a central opening to fit over the motor shaft, and having an inclined bottom and a depending spout extending loosely through the supplemental casing with the main casing formed to receive the bowl in only one position and a drip receptacle with means for mounting same in line with the depending spout portion of the bowl.

8. In a fruit juice extractor, the combination with a casing and an electric motor mounted in the casing with the motor shaft extending vertically upward and a juice extracting device on said shaft, of a supplemental casing mounted on the main casing, a bowl of china or like material loosely mounted on the supplemental casing having an upstanding boss provided with a central opening to fit over the motor shaft, and having an inclined bottom and a depending spout extending loosely through the supplemental casing with the main casing formed to receive the bowl in only one position and a drip receptacle with means for mounting same in line with the depending spout portion of the bowl, and a hood for the bowl separate from and loosely mounted on the bowl, whereby access may be had to the extractor from any desired position.

CHARLES B. BLESSING.